United States Patent [19]
Lambert

[11] Patent Number: 5,124,892
[45] Date of Patent: Jun. 23, 1992

[54] HAND MOUNTED AVIATION NIGHT VISION ILLUMINATING DEVICE

[75] Inventor: Jesse A. Lambert, Daleville, Ala.

[73] Assignee: Nite Optics, Inc., Wilkes-Barre, Pa.

[21] Appl. No.: 624,024

[22] Filed: Dec. 7, 1990

[51] Int. Cl.$^5$ .............................................. F21L 9/00
[52] U.S. Cl. .................................. 362/103; 362/62; 362/205
[58] Field of Search ............... 362/800, 109, 190, 205, 362/105, 62, 103

[56] References Cited

U.S. PATENT DOCUMENTS

| | | | |
|---|---|---|---|
| 914,975 | 3/1909 | Radley | 362/103 |
| 1,553,860 | 9/1925 | Hopper | 362/103 |
| 3,638,011 | 1/1972 | Bain et al. | 362/103 |
| 4,417,299 | 11/1983 | Rupp | 362/186 |
| 4,425,600 | 1/1984 | Barnhart | 362/84 |
| 4,459,645 | 4/1984 | Glatter | 362/205 |
| 4,521,832 | 6/1985 | Barbour | 362/103 |
| 4,580,196 | 4/1986 | Task | 362/62 |
| 4,947,291 | 8/1990 | McDermott | 362/19 |
| 4,967,330 | 10/1990 | Bell et al. | 362/800 |
| 5,031,080 | 7/1991 | Aikens et al. | 362/62 |

FOREIGN PATENT DOCUMENTS

| | | | |
|---|---|---|---|
| 2746038 | 4/1979 | Fed. Rep. of Germany | 362/205 |
| 1514696 | 1/1968 | France | 362/109 |

*Primary Examiner*—Ira S. Lazarus
*Assistant Examiner*—L. Heyman
*Attorney, Agent, or Firm*—Caesar, Rivise, Bernstein, Cohen & Pokotilow, Ltd.

[57] ABSTRACT

Apparatus for illuminating a portion of the cockpit of an aircraft utilizing a night vision imaging system. The apparatus comprising and illumination unit rising an LED for selectively producing a beam of light which will not adversely affect the operation of the night vision imaging system. The illumination unit is arranged to be releasably mounted on the pilot's index finger. The illumination unit includes a pair of depressible switches each of which is arranged to be operated by the pilot's thumb or another finger to cause the unit to produce the light beam. The unit is mounted on the pilot's index finger by a ring formed of a hook and loop fastening system.

6 Claims, 1 Drawing Sheet

HAND MOUNTED AVIATION NIGHT VISION ILLUMINATING DEVICE

BACKGROUND OF THE INVENTION

The invention relates generally to an illuminating device for use by aviators and particularly to an aviation night vision illuminating device for use in combination with an aviator's night vision imaging system.

There are presently on the market aviator's night vision imaging systems which enable pilots to fly helicopters, for example, close the ground even where there is no additional illumination. However, in order to be able to use the aviator's night vision imagining systems available, it is necessary for the pilots to turn off the illuminating means for the various gauges used in the cockpit of the helicopter or plane. The illuminating devices in the cockpit are so bright that the night vision goggles would be blown out or otherwise adversely affected or compromised by the overloading of the illumination from the gauges. That is, the illumination from the gauges when taken in directly by the goggles overloads the light amplification circuitry in the goggles and thereby turns off the goggles.

Accordingly, an important problem of a helicopter pilot when flying close to the ground at night and using a night vision imaging system is that the various gauges that must be monitored during flight cannot be seen in the dark. Also, even if the goggles are turned off or taken off, it is still imperative that the illumination of the gauges does not enable the helicopter to be seen at night from outside the cockpit.

OBJECTS OF THE INVENTION

It is therefore a general object of this invention to provide a night vision illuminating device which overcomes the disadvantages of the prior art.

It is a further object of this invention to provide an illuminating device which can be used in conjunction with an aviators night vision imaging system which illuminates the gauges in a cockpit without adversely affecting the airplane's night vision system.

It is still a further object of this invention to provide an illuminating device which is of a sufficiently high intensity to enable the pilot to see items in the cockpit, yet is not of such high intensity wherein it may adversely affect the airplane's night vision system or be seen from outside the cockpit.

It is yet a further object of this invention to provide an illuminating device which is arranged to be mounted on the hand of the pilot for ready access and operation.

SUMMARY OF THE INVENTION

These and other objects of the instant invention are achieved by providing apparatus for illuminating a portion of the cockpit of an aircraft utilizing a night vision imaging system. The apparatus comprises illumination means, e.g., an LED unit, worn by the pilot of the aircraft for producing a light beam which is sufficiently intense so that an object located within the beam may be readily distinguished by the pilot, yet is sufficiently low that it will not adversely affect the operation of the night vision imaging system. The illumination means comprises a self-contained electrical power source located within a small housing arranged to be releasably secured onto a finger of the pilot. The housing includes first manually actuatable means arranged to be actuated by another finger of the pilot for causing the illumination means to produce the light beam.

DESCRIPTION OF THE DRAWINGS

These and other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
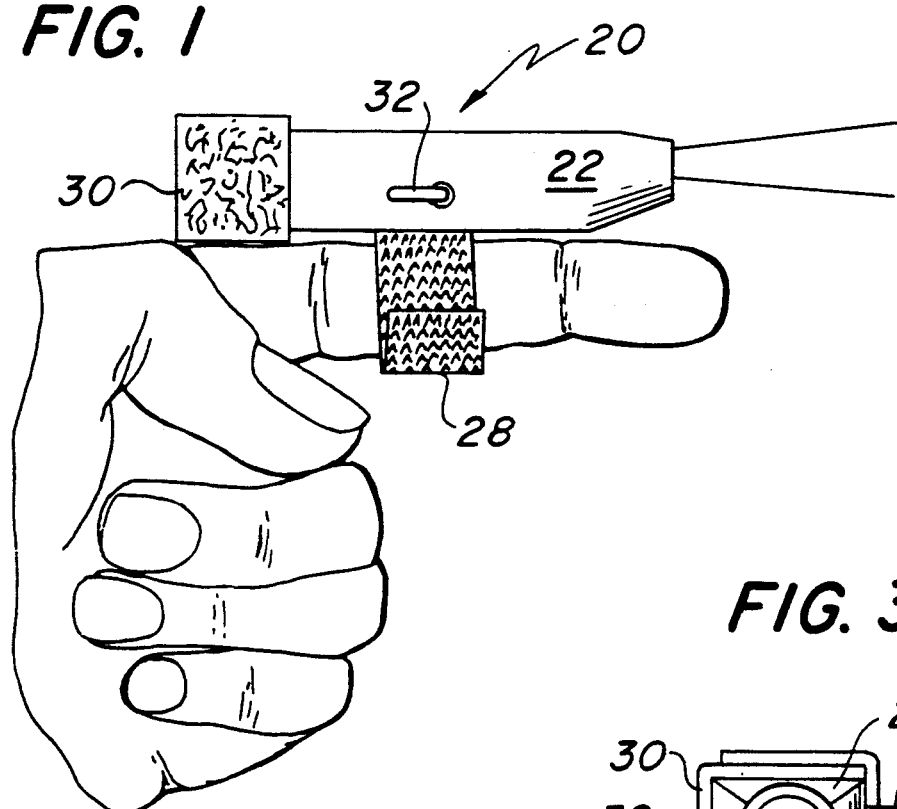
FIG. 1 is a side elevational view of a device constructed in accordance with this invention and shown mounted on the finger of a pilot and in operation.

Referring now in detail to the various figures of the drawing wherein like reference characters refer to like parts, there is shown at 20 in FIG. 1 an aviation night vision illuminating device constructed in accordance with the subject invention.

The illuminating device 20 basically comprises an elongated housing 22, a lamp comprised of a light emitting diode (LED) 24, a self contained energy source comprised of batteries 26, a first strip 28 having hooks on one side and loops on the other and a second strip 30 having hooks on one side and loops on the other and a pair of switches 32 and 34.

Figure 3:
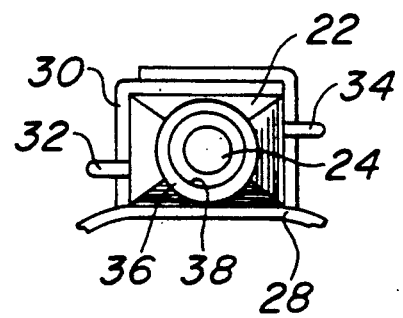
FIG. 3 is an end view taken along lines 3—3 of FIG. 2.
Figure 2:
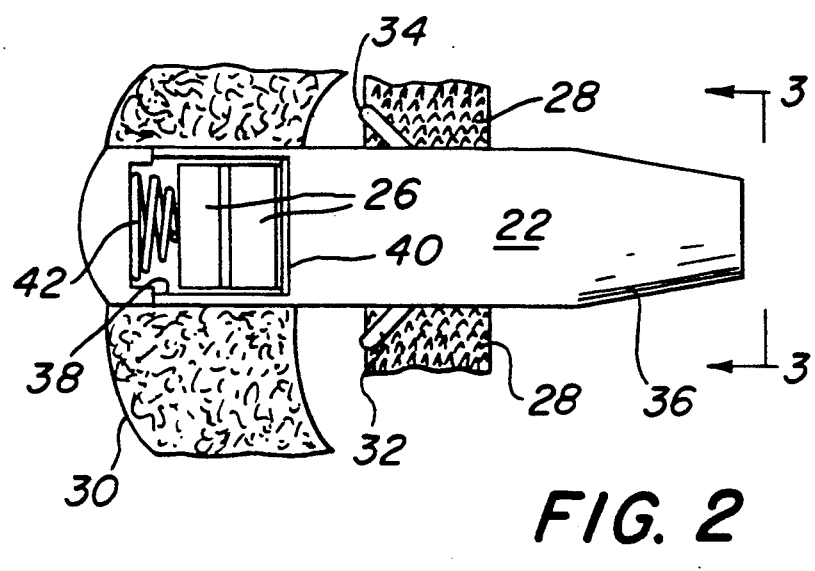
FIG. 2 is a top plan view of the device shown in FIG. 1, with portions thereof open to show some structural details of the device.

As best seen in FIG. 3, the housing 22 is generally of a square cross section having a tapered forward portion 36 in which there is provided a longitudinally extending bore 38 in which LED 24 is mounted and electrically connected by suitable wiring (not shown) to two switches 32 and 34 and two batteries 26.

The rear end of body 22 includes a rectangularly shaped cavity 38 which is located at the top of the body 22 in which the batteries 26 are disposed. The batteries are located at the forwardmost side of the cavity 38 against a vertically disposed metal plate 40 which acts as an electrical contact. The plate is secured in the front end of the cavity and makes electrical contact with the positive side of one of the battery 26. Disposed on the rear most side of the cavity 38 is a spring 42 which is provided to make contact with the negative side of batteries 26 and to urge the pair of batteries into electrical connection with plate 40.

The batteries 26 are both 1.5 volt hearing aid batteries which are serially connected to provide 3 volts across LED 24 when either or both of the switches 32 or 34 is moved to the closed position. The switches 32 and 34 are mounted in parallel so that either switch being closed causes a connection of 3 volts across LED 24.

Strip 28 is an elongated fastening tape which is secured at a central location of the strip to the bottom surface of housing 24 centrally of the housing. The strip is preferably secured to the housing by a suitable adhesive and has an outer surface which has a plurality of hook fasteners and an inner surface which has a plurality of loop fasteners. The strip is readily available on the market under the Trademark VELCRO.

The loop fasteners are preferably on the inside surface so that when the strip is made into a loop or ring, it fits against the surface of a finger such as the index finger 44 as shown in FIG. 1 with the soft side of the strip against the surface of the finger. The strip 28 is dimensioned to be long enough so that it permits fastening of the lighting device 20 to a finger whether it is exposed or covered by a suitable glove.

The second strip 30 is also an elongated fastening tape having a hook and loop fastening system and is secured to the bottom surface of housing by a suitable adhesive at the rear of the housing 22 so that it may be disposed about the opening on the top surface of housing 22 to cavity 38. The strip 30 is wide enough that it covers the cavity 38 and enables the batteries to be sealed. It is of course understood that other forms of closures may be used for sealing cavity 38.

LED 24 which is mounted in bore 38 is not only secured physically within the bore but also is electrically connected via suitable wiring to switches 32 and 34.

The LED is preferably of the size designated T 1¾ and has an illumination intensity of 140 mcd to 160 mcd.

The LED preferably has a clear or tinted envelope and has a 24 degree field of illumination which thereby enables a spot intensity to be generated by the LED 24.

In addition, the light color is green and has a frequency in the range of 562 to 567 nanometers.

The intensity of the light is such that it is not so great that viewing through the goggles of the pilot will cause a direct beam to blow out the goggles yet the intensity is not so great that it can be seen from outside the cockpit without a night vision imaging system. In addition, the placement of the LED 24 inside the bore also prevents the LED from being seen from outside the cockpit of the light being taken in directly by the night imaging goggles when the device 20 is in use.

The switches 32 and 34 are provided on both sides so that the device 20 can be worn on either the right hand or the left hand with the other hand having access to the switch of the side closest to the other hand. Alternatively, if preferred, the thumb of the hand on which the device is worn may actuate the switch closest to that thumb, as indicated in FIG. 1, for example.

In addition, the strip 28 which uses a hook and loop fastening system further facilitates the connection and mounting of the illuminating device on the hand of the user whether a glove is used or not.

Without further elaboration, the foregoing will so fully illustrate my invention that others may, by applying current or future knowledge, readily adopt the same for use under various conditions of service.

I claim:

1. Apparatus for illumination of a portion of a control panel in the cockpit of an aircraft utilizing a night vision imaging system, said apparatus comprising illumination means to be worn on the finger of an occupant of said aircraft, said illumination means comprising a housing having a front wall with a opening therein, and an LED located in said housing, said LED being recessed within said housing from said front wall so that said LED can only be seen from the front of said housing and no light from said LED can adversely said light imaging system and said LED creating a low level of light which cannot be seen from outside of said cockpit, said illumination means comprising a pair of switches for applying power to said LED, each mounted on a respective side of said housing to enable said apparatus to be worn on either the right or the left hand of the occupant and a respective switch operated by the hand on which said apparatus is worn.

2. Apparatus for illumination of a portion of a control panel in the cockpit of an aircraft utilizing a night vision imaging system, said apparatus comprising illumination means to be worn on the finger of an occupant of said aircraft, said illumination means comprising a housing having a front wall with a opening therein, and an LED located in said housing, said LED being recessed within said housing from said front wall so that said LED can only be seen from the front of said housing and no light from said LED can adversely said light imaging system and said LED creating a low level of light which cannot be seen from outside of said cockpit, said LED producing a light of a frequency with a wavelength in the range of 562 nanometers to 567 nanometers, said illumination means comprising a pair of switches for applying power to said LED, each mounted on a respective side of said housing, to enable said apparatus to be worn on the index finger of either the right hand or the left hand of the occupant and a respective switch operated by the hand on which said apparatus is worn.

3. Apparatus for illumination of a portion of a control panel in the cockpit of an aircraft utilizing a night vision imaging system, said apparatus comprising illumination means to be worn on the finger of an occupant of said aircraft, said illumination means comprising a housing having a front wall with a opening therein, and an LED located in said housing, said LED being recessed within said housing from said front wall so that said LED can only be seen from the front of said housing and no light from said LED can adversely said light imaging system and said LED creating a low level of light which cannot be seen from outside of said cockpit, said illumination means comprising a self-contained power source and said self-contained power source comprising at least one low voltage battery, self-illumination means comprising a pair of switches for applying power to said LED each mounted on a respective side of said housing to enable said apparatus to be worn on the index finger of either the right or left hand of the occupant and a respective switch operated by the hand on which said apparatus is worn.

4. The apparatus of claim 2 wherein said housing is releasably mounted on the finger of the user by a ring formed of a cooperating hook and loop fastening system.

5. The apparatus of claim 3 wherein said housing is releasably mounted on the finger of the user via a ring formed of a cooperating hook and loop fastening system.

6. Apparatus for illumination of a portion of a control panel in the cockpit of an aircraft utilizing a night vision imaging system, said apparatus comprising illumination means to be worn on the finger of an occupant of said aircraft, said illumination means comprising a housing having a front wall with a opening therein, and an LED located in said housing, said LED being recessed within said housing from said front wall so that said LED can only be seen from the front of said housing and no light from said LED can adversely said light imaging system and said LED creating a low level of light which cannot be seen from outside of said cockpit, said illumination means comprising a self-contained power source and said self-contained power source comprising at least one low voltage battery, said power source being disposed within a chamber in said housing, said housing being arranged to be sealed by cover means, said cover means comprising cooperating components of a hook and loop fastening system said housing being releasably mounted on the finger of the user via a ring form of said fastening system, said first actuable means comprising a pair of switches connected in parallel each mounted on a respective side of said housing to enable said apparatus to be worn on the finger of either the right or left hand of the occupant.

* * * * *